(12) United States Patent
Hoel

(10) Patent No.: US 8,632,042 B2
(45) Date of Patent: Jan. 21, 2014

(54) TILT AND SWIVEL MOUNTING FOR MONITORS AND OTHER DEVICES

(75) Inventor: Per O. Hoel, Gloucester, MA (US)

(73) Assignee: Draeger Medical Systems, Inc., Andover, MA (US)

(*) Notice: Subject to any disclaimer, the term of this patent is extended or adjusted under 35 U.S.C. 154(b) by 876 days.

(21) Appl. No.: 12/165,067

(22) Filed: Jun. 30, 2008

(65) Prior Publication Data
US 2009/0001238 A1 Jan. 1, 2009

Related U.S. Application Data

(60) Provisional application No. 60/947,046, filed on Jun. 29, 2007.

(51) Int. Cl.
E04G 3/00 (2006.01)
A47G 29/00 (2006.01)

(52) U.S. Cl.
USPC ............... 248/372.1; 248/278.1; 248/371

(58) Field of Classification Search
USPC ............. 248/371, 372.1, 278.1, 282.1, 284.1
See application file for complete search history.

(56) References Cited

U.S. PATENT DOCUMENTS

| | | | | |
|---|---|---|---|---|
| 3,542,456 | A | * | 11/1970 | Huge ............................ 359/865 |
| 4,068,961 | A | | 1/1978 | Ebner et al. |
| 4,415,136 | A | * | 11/1983 | Knoll ......................... 248/181.2 |
| 4,562,988 | A | | 1/1986 | Bumgardner |
| 4,589,713 | A | | 5/1986 | Pfuhl et al. |
| 4,964,606 | A | | 10/1990 | Beam et al. |
| 5,031,871 | A | * | 7/1991 | Ohta et al. .................... 248/544 |
| 5,102,081 | A | | 4/1992 | Barchus |
| 5,398,901 | A | | 3/1995 | Brodmann et al. |
| 5,398,991 | A | | 3/1995 | Smith et al. |
| 5,582,379 | A | | 12/1996 | Keselman et al. |
| 5,664,752 | A | | 9/1997 | Matthiessen et al. |
| 5,743,503 | A | | 4/1998 | Voeller et al. |
| 6,007,038 | A | | 12/1999 | Han |
| 6,045,103 | A | | 4/2000 | Costa et al. |

(Continued)

FOREIGN PATENT DOCUMENTS

| | | |
|---|---|---|
| CN | 1520493 A | 8/2004 |
| EP | 0075259 A | 3/1983 |

(Continued)

OTHER PUBLICATIONS

International Search Report for International Application No. PCT/US2008/068804, dated Oct. 31, 2008.

*Primary Examiner* — Joshua J Michener
*Assistant Examiner* — Chiedu Chibogu
(74) *Attorney, Agent, or Firm* — Mintz Levin Cohn Ferris Glovsky and Popeo, P.C.

(57) ABSTRACT

A tilt and swivel mounting device may include a base member, a first disc in contact with the base member, and a second disc in contact with the first disc. The first disc may be restricted to moving substantially in a first direction relative to the base member. The second disc may be restricted to moving substantially in a second direction, wherein the second direction is substantially perpendicular to the first direction relative to the first disc. A cover may be attached to the base member for housing the first and second discs in an assembly compressible in response to a user rotatable control. A support base may be attached to an axial shaft, and the axial shaft may be axially coupled to the assembly.

14 Claims, 3 Drawing Sheets

(56) References Cited

U.S. PATENT DOCUMENTS

| | | |
|---|---|---|
| RE36,978 E | 12/2000 | Moscovitch |
| 6,216,989 B1 | 4/2001 | Shioya et al. |
| 6,302,549 B1 * | 10/2001 | Branham et al. ............. 359/871 |
| 6,318,694 B1 | 11/2001 | Watanabe |
| 6,553,587 B1 | 4/2003 | Barker et al. |
| 6,554,238 B1 | 4/2003 | Hibberd |
| 6,619,685 B2 * | 9/2003 | Teague ......................... 280/477 |
| 6,801,426 B2 | 10/2004 | Ichimura |
| 6,829,854 B2 | 12/2004 | Reynolds |
| 6,874,743 B2 | 4/2005 | Watanabe et al. |
| 7,028,961 B1 | 4/2006 | Dittmer et al. |
| 7,121,514 B2 | 10/2006 | Twyford |
| 7,152,836 B2 | 12/2006 | Pfister et al. |
| 7,284,869 B1 * | 10/2007 | Weaver ......................... 359/872 |
| 7,316,377 B2 | 1/2008 | Smed |
| 7,380,760 B2 * | 6/2008 | Dittmer ...................... 248/278.1 |
| 2004/0227049 A1 * | 11/2004 | Lang et al. ..................... 248/476 |
| 2006/0016954 A1 * | 1/2006 | Saxwold ....................... 248/467 |
| 2006/0076463 A1 * | 4/2006 | Drew ............................ 248/121 |
| 2006/0175501 A1 * | 8/2006 | Richter ..................... 248/288.31 |

FOREIGN PATENT DOCUMENTS

| | | |
|---|---|---|
| WO | 2006-033494 A | 3/2006 |
| WO | 2007-046563 A | 4/2007 |
| WO | WO 2007046563 A1 * | 4/2007 |

\* cited by examiner

TILT AND SWIVEL MOUNTING FOR MONITORS AND OTHER DEVICES

CROSS-REFERENCE TO RELATED APPLICATION

This application claims the benefit of priority of U.S. Provisional Patent Application No. 60/947,046, filed Jun. 29, 2007, the disclosure of which is incorporated herein by reference in its entirety as if fully set forth herein.

TECHNICAL FIELD

The present invention is directed generally to mounting devices. More particularly, the present invention is directed to tilt and swivel mounting devices for monitors and other devices.

BACKGROUND

Known tilt swivel device mounting systems typically employ various friction hinge and clamped axle tilt mechanisms. A partial sphere disk motion, for example has appeared in certain bases of computer displays which provide tilt and rotation. Tool-based adjustable clamping within a partial sphere have been employed in certain equipment mounts for wall mounting arms. Known tilt and swivel mounting systems are subject to undesirable clockwise or counterclockwise rotation which allows mounted equipment to assume a non-level position (i.e. the top of the equipment is not kept parallel to the floor).

Known systems depend upon either the use of a wrench or screwdriver etc. to increase or decrease drag at pivot points of a tilt and swivel device in response to increased or lightened equipment loads. Known systems depend upon construction using components to provide a predetermined load resistance which is not adjustable. The need for using a tool during adjustment or need to select a device with a fixed appropriate load rating makes the known systems inconvenient to use. Further, in some known systems there is nothing to prevent the undesirable rotation mentioned above. Devices according to the disclosure address these deficiencies and related problems.

It may be desirable to provide a mounting device that limits an object to motion in two directions perpendicular to one another while maintaining substantially level alignment in relation to a horizontal surface. It may be desirable to provide a mounting device that can be quickly and easily adjusted without the need for a special tool. It may be desirable to provide a mounting device that permits mounting of objects of varying weight by allowing for adjustment of compression forces on internal components of the mounting device.

SUMMARY

According to various aspects of the disclosure, a tilt and swivel mounting device may include a base member, a first disc in contact with the base member, and a second disc in contact with the first disc. The first disc may be restricted to moving substantially in a first direction relative to the base member. The second disc may be restricted to moving substantially in a second direction, wherein the second direction is substantially perpendicular to the first direction relative to the first disc. A cover may be attached to the base member for housing the first and second discs in an assembly compressible in response to a user rotatable control. A support base may be attached to an axial shaft, and the axial shaft may be axially coupled to the assembly.

In accordance with various aspects of the disclosure, a tilt and swivel mounting device may include a base member, a first disc in contact with the base member, and a second disc in contact with the first disc. The first disc may be restricted to moving substantially in a first direction relative to the base member. The second disc may be restricted to moving substantially in a second radial direction, wherein a plane of the second direction may be substantially perpendicular to a plane of the first direction. A cover may be attached to the base member for housing the first and second discs between the base member and the cover in an assembly compressible in response to a user rotatable control. A support base may be attached to an axial shaft, and the shaft may be axially coupled to the assembly and may pass through the cover and engage at least one of the first and second discs.

According to some aspects of the disclosure, a tilt and swivel mounting device may include a base member, a first disc coupled with the base member such that the first disc is restricted to moving substantially in a first direction relative to the base member, and a second disc coupled with the first disc such that the second disc is restricted to moving substantially in a second direction relative to the first disc. The second direction may be substantially perpendicular to the first direction. A cover may be attached to the base member for housing the first and second discs in an assembly, and a control knob may be coupled to the assembly via an axial shaft. The control knob may be configured to rotate about the shaft and to move axially along the shaft as it rotates. A support base may be attached to the axial shaft.

DETAILED DESCRIPTION

Figure 1:
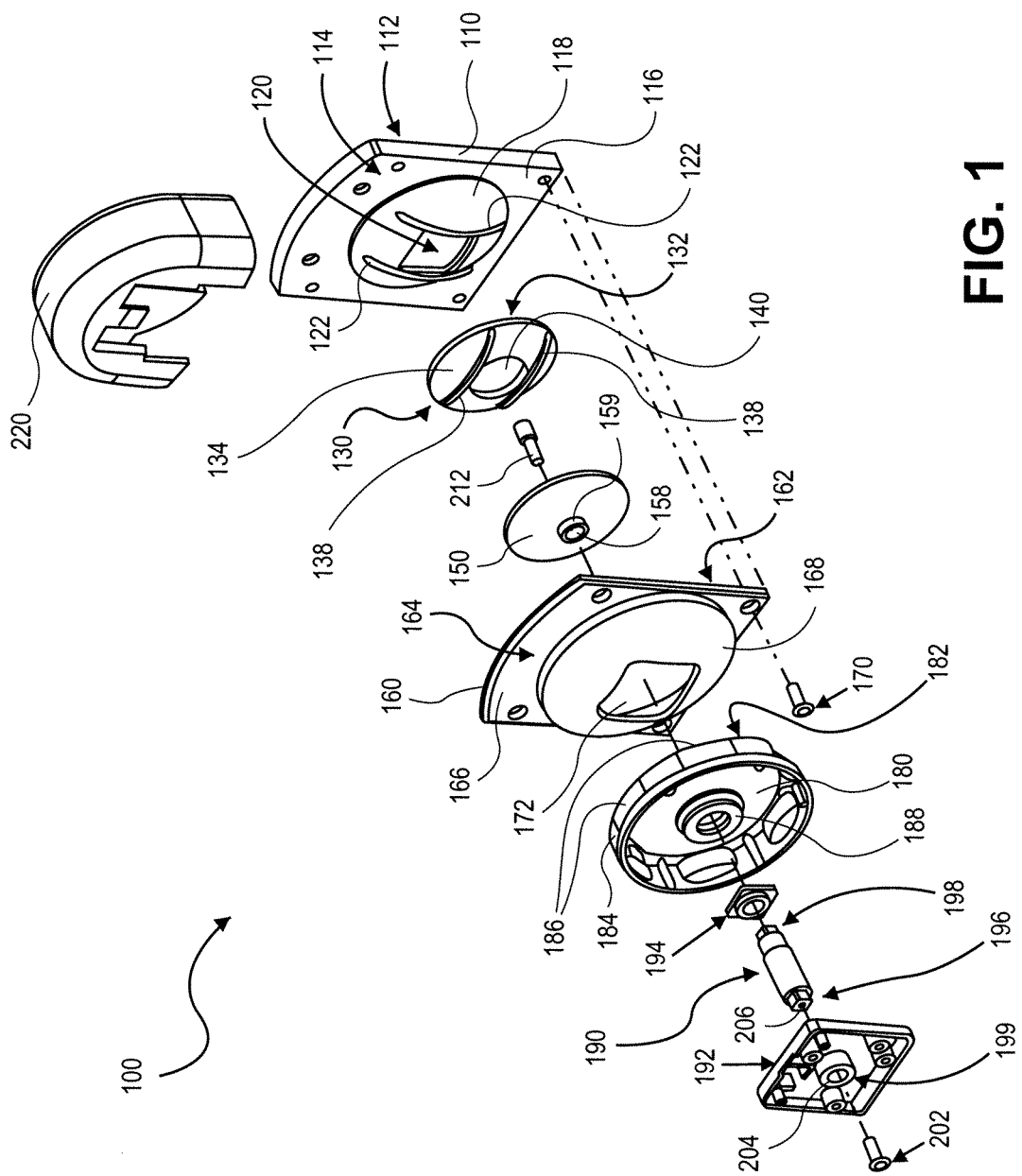
FIG. 1 is an exploded view of an exemplary tilt and swivel mounting device in accordance with various aspects of the invention.
Figure 2:
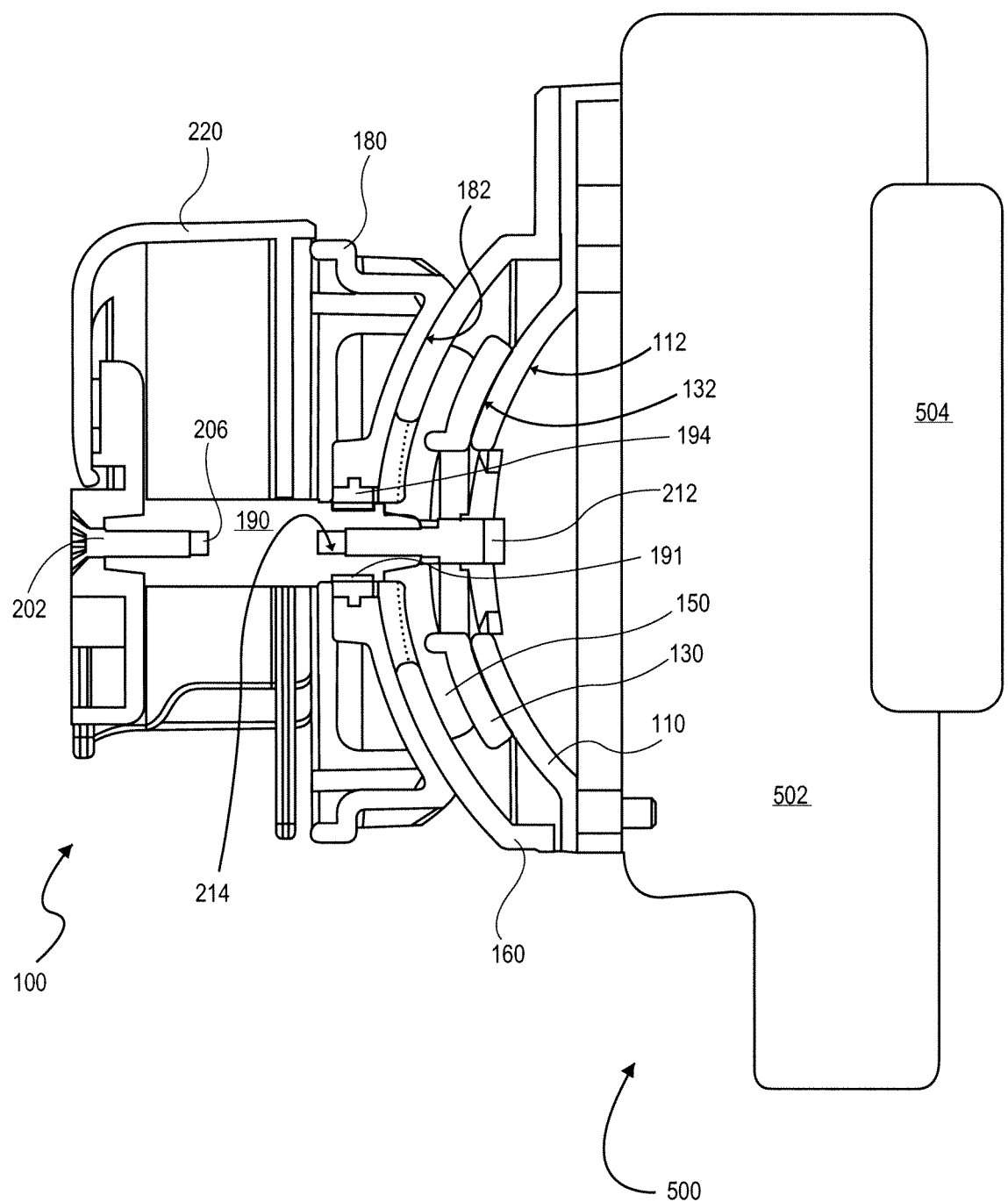
FIG. 2 is a cross-sectional view of the exemplary tilt and swivel mounting device of FIG. 1 with exemplary equipment mounted thereto.

An exemplary embodiment of a tilt and swivel mounting device 100 is illustrated in FIGS. 1 and 2. The mounting device 100 may include a base member 110 having a first side 112 and a second side 114. The second side 114 includes a substantially planar portion 116 and a convex curved portion 118 having a spherical radius. The curved portion 118 protrudes from the planar portion 116 in a first direction extending away from the first side 112.

The curved portion 118 may include a substantially central opening 120. The opening 120 may be square, circular, oval, or any other desired shape. The curved portion 118 may include one or more raised ribs 122 on the second side 114 thereof. As shown in FIG. 1, according to various aspects, a pair of substantially linear, raised ribs 122 may extend parallel to one another on opposite sides of the opening 120. Persons skilled in the art would appreciate that the curved portion 118 may include one rib or more than two ribs.

The mounting device 100 may include a first disc 130 and a second disc 150. The first disc 130 may be sandwiched between the second disc 150 and the base plate 110. The first disc 130 may have a concave first side 132 facing the second side 114 of the base member 110 and a convex second side 134 facing the second disc 150. The first disc 130 may be curved with a spherical radius substantially matching the spherical radius of the curved portion 118 of the base member 110.

Figure 3:
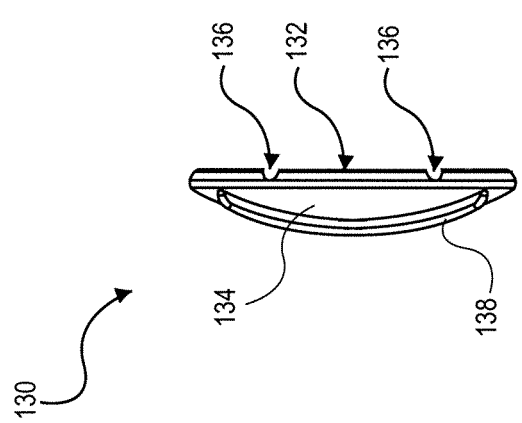
FIG. 3 is a side view of an exemplary first disc of the device shown in FIG. 1.

The first side 132 of the first disc 130 may include a number of substantially linear grooves 136 (FIG. 3) corresponding to the number of ribs 122 on the second side 114 of the base member 110. The grooves 136 may be arranged substantially parallel to one another. The second side 134 of the first disc 130 may include one or more substantially linear, raised ribs 138 extending substantially perpendicular to the grooves 136 and the ribs 122 of the base member 110. As shown in FIG. 1, according to various aspects, a pair of ribs 138 may extend parallel to one another on opposite sides of a substantially central opening 140. Persons skilled in the art would appreciate that the first disc 130 may include one rib or more than two ribs.

Figure 4:
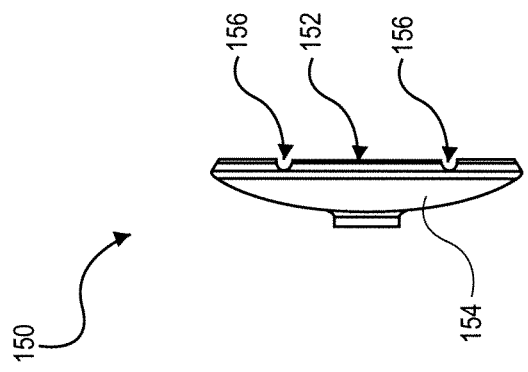
FIG. 4 is a side view of an exemplary second disc of the device shown in FIG. 1.

The second disc 150 may have a concave first side 152 (FIG. 4) facing the second side 134 of the first disc 130 and a convex second side 154 (FIG. 4) facing away from the first disc 130. The second disc 150 may be curved with a spherical radius substantially matching the spherical radius of the first disc 130 and the curved portion 118 of the base member 110. The first side 152 of the second disc 150 may include a number of substantially linear grooves 156 (FIG. 4) corresponding to the number of ribs 138 on the second side 134 of the first disc 130. The grooves 156 may be arranged substantially parallel to one another. The second disc 150 may include a central through hole 158.

According to various aspects, the first disc 130 and/or the second disc 150 may have substantially circular perimeters. One or both of the discs 130, 150 may be made of metal, plastic, and/or composite material. According to some aspects, the base member 110 may be made of metal, plastic, and/or composite material.

The mounting device 100 may include a cover 160 that cooperates with the base member 110 to sandwich the first and second discs 130, 150 therebetween. The cover 160 may have a first surface 162 facing the second disc 150 and a second surface 164 facing away from the second disc 150. The cover 160 may include a planar portion 166 and a curved portion 168. The curved portion 168 of the cover 160 may have a spherical radius that substantially matches that of the first disc 130, the second disc 150, and the curved portion 118 of the base member 110. The cover 160 may be coupled with the base member 110, for example, via one or more screws 170 or any known connection members. The cover 160 may include a substantially central opening 172.

According to various aspects, the mounting device 100 may include a control knob 180 having a first, curved surface 182 facing the second surface 164 of the cover 160. The curved surface 182 of the control knob 180 may have a spherical radius that substantially matches that of the first disc 130, the second disc 150, the curved portion 118 of the base member 110, and the curved portion 168 of the cover 160. According to various aspects, the cover 160 and/or the control knob 180 may be made of metal, plastic, and/or composite material.

The control knob 180 may include an outer wall 184 about its periphery extending from the curved surface 182 in a direction away from the cover 160. The outer wall 184 may be structured and arranged to facilitate gripping by a user. For example, the outer wall 184 may include indented regions 186 to facilitate gripping of the control knob 180. The control knob 180 may include a hub 188 configured to receive an axial shaft 190, described in more detail below. The mounting device 100 may include a support 192 coupled to the control knob 180 via the shaft 190. The support 192 may accommodate various equipment 500 desired to be mounted thereto.

According to various aspects, the control knob 180 may be molded about a threaded collar 194. The shaft 190 may include a threaded portion 191 for mating with the threaded collar 194. A first end 196 of the shaft 190 may be formed as a square, a D-shape, a torx, or the like and the support 192 may include a complementarily-shaped bore 199 for axially receiving the first end 196 of the shaft 190 so that the shaft 190 does not rotate relative to the support 192. Similarly, a second end 198 of the shaft 190 may be formed as a square, a D-shape, a torx, or the like and the second disc 150 may include complementarily-shaped bore 159 for axially receiving the second end 198 of the shaft 190 so that the shaft 190 does not rotate relative to the second disc 150.

According to some embodiments, the shaft 190 may be axially coupled to the support 192 by a fastener 202, such as, for example, a screw. The fastener 202 may extend through a through hole 204 in the support 192 and into a substantially central bore 206 in the shaft 190. As would be understood by persons skilled in the art, the fastener 202 may include a head sized larger than the through hole 204 to maintain appropriate positioning of the fastener 202.

According to various embodiments, the shaft 190 may be axially coupled to the second disc 150 by a fastener 212, such as, for example, a screw. The fastener 212 may extend from first side 152 of the second disc 150 through the through hole 158 in the second disc 150 and into a bore 214 (FIG. 2) in the shaft 190. As would be understood by persons skilled in the art, the fastener 212 may include a head sized larger than the through hole 158 to maintain appropriate positioning of the fastener 212. It should also be appreciated that, in some embodiments, bores 206, 214 may comprise a single through bore.

In some embodiments, the device 100 may include a shroud 220, for example, a cable shroud, configured to be coupled to the support 192. The shroud 220 may be coupled to the support 192 via any known structure and/or method such as, for example, snap-fit, friction-fit, or the like. The shroud may be structured and arranged to cover and/or protect electrical cables that extend from an object, such as, for example, a monitor, mounted on the tilt and swivel device 100. According to various aspects, the support 192 and/or the shroud 220 may be made of metal, plastic, and/or composite material.

The device 100 may be assembled as shown in FIG. 2. For example, the first disc 130 may be in contact with or sufficiently near the curved portion 118 of the base member 110 such that the ribs 122 of the base member 110 are received in the grooves 136 of the first disc 130 in a manner that prevents relative rotation between the first disc 130 and the base member 110. Such assembly thus restricts relative movement between the first disc 130 and the base member 110 to a first, substantially linear direction, which defines a first plane of movement.

The second disc 150 may be in contact with or sufficiently near the first disc 130 such that the ribs 138 of the first disc 130 are received in the grooves 156 of the second disc 150 in a manner that prevents relative rotation between the first disc 130 and the second disc 150. Such assembly thus restricts relative movement between the first disc 130 and the second disc 150 to a second, substantially linear direction, which defines a second plane of movement.

As described above, the grooves 136 may be arranged substantially perpendicular to the ribs 138 of the first disc 130. Consequently, according to various aspects, the first and second directions, and first and second planes, may be substantially perpendicular to each other. Accordingly, the support 192 and any equipment 500 mounted thereon may be limited to substantially linear movement in two substantially perpendicular directions. For equipment with viewable display screens, the two perpendicular directions may correspond to horizontal and vertical tilts, which can be made without losing a parallel condition with the floor, which may be desirable in certain aspects.

Upon assembly, exemplary tilt-swivel devices according to the disclosure may allow equipment 500 attached to the device to be easily and quickly repositioned within a range of horizontal and/or vertical movements to achieve improved viewing and/or usage orientation. According to various exemplary embodiments, the equipment 500 may comprise a docking station 502 configured to removably receive a monitor 504, for example, a patient monitor. It should be appreciated that, in various aspects, the equipment 500 may comprise a monitor without a docking station.

It should be appreciated that the length of the shaft 190 may vary according to desired mounting arrangements. For example, if it is desired to have the equipment 500 mounted nearer to the control knob 180, the shaft 190 can be shorter, but if it is desired to have the equipment 500 spaced further from the control knob 180, the shaft 190 can be longer.

According to various aspects, the system may be adjustable (for example, in relation to the weight of the mounted equipment) without the need for a special tool of any kind. According to various aspects, the control knob 180, or adjustment wheel, allows a user to alter the drag of the tilt-swivel device without the need to provide any special tool. According to some aspects, the control knob 180 may be rotated, for example, by a user, relative to the threaded portion 191 of the shaft 190. Such rotation causes the control knob 180 to translate along the shaft 190 toward the cover 160, thereby urging the cover 160 toward the base member 110 and compressing the first and second discs 130, 150 and altering the drag thereon. Thus, in some embodiments, the alteration of the drag of the tilt-swivel device may be achieved by compression of an assembly of the cover 160, the first and second discs 130, 150, and the base member 110, including the tilt-swivel device's internal components. As during the initial setup of equipment, alteration can be done quickly and easily in response, for example, to the addition of the added weight of accessory cables or product modules, which may necessitate greater drag.

In other embodiments, the means by which the variable compression of the tilt-swivel device's internal components is applied may take different forms. Further, in different embodiments, instead of supporting a base for a mounting clamp, the threaded shaft of the tilt-swivel device may be extended in the form of a hook, for example. With the assembly of compressible disks mounted to a wall (rather than to the back of a piece of equipment) such a hook may be used to hang various items and the system may provide the ability to quickly change the height, side-to-side positioning, and/or the supported weight.

In other embodiments, the assembly of compressible disks may be mounted to (or rested upon) a tabletop and, with the threaded shaft extended, it may become the stalk for an adjustable position light fixture. The system may provide a control knob providing for tool-free and quick adjustment as well as preventing rotation between the compressible disks which travel only horizontally and vertically.

The tilt-swivel device allows various items of equipment to be mounted in a non-static manner. For monitors for example, this means mounting (with the use of a mating clamp) to hospital wall rails, IV poles, bed rails, shelf structures and the like. Once mounted the tilt-swivel provides for easy, user controlled shifts in positioning for ease of viewing and/or access of the equipment. The system is usable in a wide variety of consumer product or industrial equipment.

It will be apparent to those skilled in the art that various modifications and variations can be made to the devices of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A tilt and swivel mounting device, comprising:
a base member comprising ribs on a first surface of the base member and configured to be coupled to a second device on a second surface;
a first disc comprising grooves on a first surface of the first disc and ribs on a second surface of the first disc, the grooves of the first disc receiving the ribs of the base member thereby restricting substantial movement of the base member relative to the first disc to movement around a first axis of rotation;
a second disc comprising a first bore extending through the second disc and grooves on a first surface of the second disc, the grooves of the second disc receiving the ribs of the first disc thereby restricting substantial movement of the base member relative to the second disc to movement around a second axis of rotation, the second axis of rotation being substantially perpendicular to the first axis of rotation;
a cover comprising a planar portion and a curved portion, wherein the planar portion contacts and is fixedly attached to the base member housing the first and second discs between the cover and the base member;
an axial shaft comprising a first end, a second end and an axis extending along the length of the axial shaft, wherein the first end of the axial shaft is fixedly attached to the first bore of the second disc, and wherein the first end has a first geometry complementary to the first bore that prevents relative rotation between the axial shaft and the second disc;
a support base comprising a second bore, wherein the second end of the axial shaft is fixedly attached to the second bore, and wherein the second end has a second geometry complementary to the second bore that prevents relative rotation between the axial shaft and the support base; and
a control knob rotatably coupled to the axial shaft, the control knob being configured to move along the axis of the axial shaft upon rotation to modify compression of the cover;
wherein the second surface of the base member is prevented from assuming a non-level position upon adjustment of the tilt and swivel mounting device around the first axis of rotation or the second axis of rotation.

2. The tilt and swivel mounting device according to claim 1, wherein the first surfaces of the first disc and the second disc are substantially concave and the second surfaces of the first disc and the second disc are substantially convex.

3. The tilt and swivel mounting device according to claim 2, wherein the concave first surfaces and the convex second surfaces are substantially spherical.

4. The tilt and swivel mounting device according to claim 3, wherein the substantially spherical surfaces of the concave first surfaces match the substantially spherical surfaces of the convex second surfaces.

5. The tilt and swivel mounting device according to claim 1, wherein the first and second discs each have substantially spherical surfaces of substantially similar spherical radius.

6. The tilt and swivel mounting device according to claim 1, wherein the first and second discs have substantially circular perimeters.

7. The tilt and swivel mounting device according to claim 1, wherein at least one of the first and second discs are made of at least one of metal, plastic, and composite material.

8. The tilt and swivel mounting device according to claim 1, wherein the control knob is adjustable by manual action without use of any tools.

9. The tilt and swivel mounting device according to claim 1, wherein rotation of the control knob in a first direction tightens the second disc against the cover to increase friction and lock the cover from moving relative to knob.

10. The tilt and swivel mounting device according to claim 1, wherein the second device is a monitor.

11. The tilt and swivel mounting device according to claim 10, wherein the monitor is a patient monitor for characterizing physiological measurements of a patient.

12. The tilt and swivel mounting device according to claim 1, wherein the second device is a docking station configured to removably receive a monitor.

13. A tilt and swivel mounting device, comprising:
- a base member comprising ribs on a first surface of the base member and configured to be coupled to a second device on a second surface;
- a first disc comprising means for restricting substantial movement of the base member relative to the first disc to movement around a first axis of rotation;
- a second disc comprising a first bore extending through the second disc and means for restricting substantial movement of the base member relative to the second disc to movement around a second axis of rotation, the second axis of rotation being substantially perpendicular to the first axis of rotation;
- a cover comprising a planar portion and a curved portion, wherein the planar portion contacts and is fixedly attached to the base member housing the first and second discs between the cover and the base member;
- an axial shaft comprising a means for fixedly attaching a first end of the shaft to the first bore of the second disc, and wherein the first end has a first geometry complementary to the first bore that prevents relative rotation between the axial shaft and the second disc and a means for fixedly attaching a second end of the axial shaft to a support base comprising a second bore, wherein the second end of the axial shaft is fixedly attached to the second bore, and wherein the second end has a second geometry complementary to the second bore that prevents relative rotation between the axial shaft and the support base; and
- means rotatably coupled to the axial shaft for modifying compression of the cover;
- wherein the second surface of the base member is prevented from assuming a non-level position upon adjustment of the tilt and swivel mounting device around the first axis of rotation or the second axis of rotation.

14. A tilt and swivel mounting device for a patient monitor, comprising:
- a base member comprising ribs on a first surface of the base member and configured to be coupled to the patient monitor on a second surface;
- a first disc comprising means for restricting substantial movement of the base member relative to the first disc to movement around a first axis of rotation;
- a second disc comprising a first bore extending through the second disc and means for restricting substantial movement of the base member relative to the second disc to movement around a second axis of rotation, the second axis of rotation being substantially perpendicular to the first axis of rotation;
- means comprising a planar portion and a curved portion, wherein the planar portion contacts and is fixedly attached to the base member for housing the first and second discs between the means and the base member; and
- an axial shaft comprising a means for fixedly attaching a first end of the shaft to the first bore of the second disc, and wherein the first end has a geometry complementary to the first bore that prevents relative rotation between the axial shaft and the second disc and a means for fixedly attaching a second end of the axial shaft to a support base comprising a second bore, wherein the second end of the axial shaft is fixedly attached to the second bore, and wherein the second end has a second geometry complementary to the second bore that prevents relative rotation between the axial shaft and the support base;
- wherein the second surface of the base member is prevented from assuming a non-level position upon adjustment of the tilt and swivel mounting device around the first axis of rotation or the second axis of rotation.

* * * * *

UNITED STATES PATENT AND TRADEMARK OFFICE
CERTIFICATE OF CORRECTION

Page 1 of 1

PATENT NO. : 8,632,042 B2
APPLICATION NO. : 12/165067
DATED : January 21, 2014
INVENTOR(S) : Hoel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this
Fourth Day of August, 2015

Michelle K. Lee
*Director of the United States Patent and Trademark Office*